US012620269B1

(12) United States Patent
Herron

(10) Patent No.: US 12,620,269 B1
(45) Date of Patent: May 5, 2026

(54) VEHICLE DIAGNOSTIC SCAN AND COLLISION DATA RECORDER READER DEVICE AND METHOD

(71) Applicant: Opus IVS, Inc., Ann Arbor, MI (US)

(72) Inventor: Brian J. Herron, Dexter, MI (US)

(73) Assignee: Opus IVS, Inc., Dexter, MI (US)

( * ) Notice: Subject to any disclaimer, the term of this patent is extended or adjusted under 35 U.S.C. 154(b) by 60 days.

(21) Appl. No.: 17/964,542

(22) Filed: Oct. 12, 2022

Related U.S. Application Data

(63) Continuation-in-part of application No. 17/743,060, filed on May 12, 2022.

(51) Int. Cl.
*G07C 5/00* (2006.01)
*G07C 5/08* (2006.01)

(52) U.S. Cl.
CPC ............. *G07C 5/008* (2013.01); *G07C 5/006* (2013.01); *G07C 5/0808* (2013.01); *G07C 5/085* (2013.01); *G07C 2205/02* (2013.01)

(58) Field of Classification Search
CPC .......................... G07C 5/0808; G07C 2205/02
See application file for complete search history.

(56) References Cited

U.S. PATENT DOCUMENTS

| | | | | |
|---|---|---|---|---|
| 6,212,449 | B1 * | 4/2001 | Wellman | B66F 9/24 701/31.8 |
| 8,892,451 | B2 * | 11/2014 | Everett | G06Q 10/0833 340/576 |
| 10,949,553 | B1 * | 3/2021 | Kowalick | G06F 21/44 |
| 11,842,582 | B2 * | 12/2023 | Palai | G05B 19/0421 |
| 2006/0025897 | A1 * | 2/2006 | Shostak | G06K 19/0717 701/1 |
| 2007/0150140 | A1 * | 6/2007 | Seymour | G07C 5/008 701/33.4 |
| 2009/0271239 | A1 * | 10/2009 | Underdal | G06Q 10/20 705/305 |
| 2013/0317694 | A1 * | 11/2013 | Merg | G07C 5/008 701/31.6 |
| 2014/0288761 | A1 * | 9/2014 | Butler | G07C 5/0816 701/29.6 |
| 2015/0039397 | A1 * | 2/2015 | Fuchs | G06Q 30/0283 705/7.35 |
| 2017/0301154 | A1 * | 10/2017 | Rozint | G07C 5/008 |
| 2019/0228322 | A1 * | 7/2019 | Wenner | G07C 5/0808 |
| 2019/0385385 | A1 * | 12/2019 | Davidson | G07C 5/0808 |
| 2020/0334927 | A1 * | 10/2020 | Rozint | B60R 21/0136 |
| 2023/0161583 | A1 * | 5/2023 | Fang | B60R 16/023 701/36 |
| 2024/0212403 | A1 * | 6/2024 | Rozint | G07C 5/0808 |
| 2025/0085703 | A1 * | 3/2025 | Pasupureddy | G05B 23/0235 |

* cited by examiner

*Primary Examiner* — Daryl C Pope
(74) *Attorney, Agent, or Firm* — Gardner, Linn, Burkhart & Ondersma LLP

(57) ABSTRACT

A system and method for assessing a vehicle's electronic system after a crash includes a vehicle diagnostic computer tool configured to be operatively connected with an electronic system of a vehicle to obtain scan data from the electronic system of the vehicle using a diagnostic scanning program and to obtain collision data from an event data recorder of the vehicle using a collision data recorder program. The collision data and scan data are reported together, such as in a report generated by the vehicle diagnostic computer tool, for evaluating whether vehicle systems requiring repair based on the scan data are attributable to a particular collision event based on the collision data.

15 Claims, 6 Drawing Sheets

VEHICLE DIAGNOSTIC SCAN AND COLLISION DATA RECORDER READER DEVICE AND METHOD

CROSS REFERENCE TO RELATED APPLICATION

The present application is a continuation-in-part of U.S. application Ser. No. 17/743,060, filed on May 12, 2022, which is hereby incorporated herein by reference in its entirety

BACKGROUND AND FIELD OF THE INVENTION

The present invention is directed to a vehicle diagnostic system, and in particular to a vehicle diagnostic scan tool configured to obtain diagnostic data while performing a diagnostic scan of the electronic system of a vehicle and obtain collision data from an event data recorder ("EDR") of the vehicle.

Vehicle diagnostic systems employing diagnostic scan devices or tools are used in automotive repair facilities to diagnose and repair computer-based vehicle systems, where vehicles may have differing computer-based systems depending on the configuration and options installed on the vehicle. Vehicle diagnostic scan systems may include or use one or more diagnostic software scanning programs or applications, such as applications developed by an OEM or an aftermarket diagnostic company. OEM diagnostic applications may include proprietary diagnostic application software exclusive to a particular OEM and may be required for certification purposes to validate repairs performed on a vehicle. As part of an accident investigation, crash data can be read from a vehicle's event data recorder(s) for accident investigations by law enforcement.

SUMMARY OF THE INVENTION

The present invention provides a vehicle diagnostic system and method including a vehicle diagnostic computer tool or device for performing a diagnostic vehicle scan of a vehicle electronic system, including electronic control units (ECUs), and also reads or scans or obtains data from an event data recorder (EDR) or crash data recorder of the vehicle. Such a vehicle diagnostic tool can be used to obtain diagnostic data or scan data by scanning a vehicle after a collision, or any other event causing damage to the vehicle, to determine if there are any faults such as may be reported as diagnostic trouble codes ("DTCs") by the ECUs of the vehicle's electronic system that need to be repaired. The vehicle diagnostic system additionally reads collision data out of or from one or more vehicle crash data recorders. The collision data output from the crash data recorder is incorporated with the scan data from the diagnostic vehicle scan program to generate a vehicle report such as may be used for a repair estimate. In particular, the data from the crash data recorder may be used to evaluate the results of the vehicle scan to determine if the vehicle systems requiring repair would have been expected or attributable to a particular collision event based on the collision data from the vehicle data recorder. In this way, repairs to a vehicle may be limited to just those that are attributable to the specific collision event, or insurance coverage for vehicle repairs may be limited to those attributable to the specific collision event.

In accordance with an aspect of the present invention, a method of assessing damage to a vehicle includes providing a vehicle diagnostic system comprising a vehicle diagnostic computer tool configured to operate in a mode to scan a vehicle to obtain scan data and configured to obtain collision data from an event data recorder of the vehicle, connecting the vehicle diagnostic computer tool with a diagnostic port of the vehicle to be in communication with an electronic system of the vehicle, obtaining scan data from the electronic system of the vehicle with the vehicle diagnostic computer tool using a diagnostic scanning program, and obtaining collision data from the event data recorder with the vehicle diagnostic computer tool using a collision data reader program.

In particular embodiments, the method further comprises reporting the scan data together with the collision data for evaluating whether vehicle systems requiring repair based on the scan data are attributable to a particular collision event based on the collision data, which may include generating a report comprising the scan data together with the collision data. The vehicle diagnostic computer tool may be configured to generate the report. Still further, the scan data and the collision data may be transmitted to a remote computer via the vehicle diagnostic computer tool.

In a further particular embodiment, the method additionally comprises providing a scan data evaluation program, and wherein the method further comprises evaluating the scan data and the collision data with the scan data evaluation program for attributing vehicle systems requiring repair based on the scan data to a particular collision event based on the collision data.

One or more of the of the diagnostic scanning program, the collision data reader program and the scan data evaluation program may be retained in a memory of the vehicle diagnostic computer tool, or may be retained at a remote computer and accessible via the vehicle diagnostic computer tool.

In accordance with another aspect of the present invention, a vehicle diagnostic system configured for scanning an electronic system of a vehicle to obtain scan data and configured to obtain collision data from an event data recorder of the vehicle comprises a vehicle diagnostic computer tool comprising a vehicle interface and a computer module, where the vehicle diagnostic computer tool is configured to connect to a data port of a vehicle to be in communication with an electronic system of the vehicle. The system further includes a diagnostic scanning program configured for use with the vehicle diagnostic computer tool to obtain scan data from the electronic system of the vehicle, and includes a collision data reader program configured for use with the vehicle diagnostic computer tool to obtain collision data from the event data recorder. The vehicle diagnostic system is operable to report the scan data together with the collision data for evaluating whether vehicle systems requiring repair based on the scan data are attributable to a particular collision event based on the collision data.

In a particular embodiment, the vehicle diagnostic computer tool is configured to generate a report of the scan data together with the collision data. The system may further include a scan data evaluation program, where the scan data evaluation program is configured to evaluate the scan data and the collision data for attributing vehicle systems requiring repair based on the scan data to a particular collision event based on the collision data.

The vehicle diagnostic computer tool scans a vehicle electronic system for fault codes, such as DTCs, and additionally reads data from one or more crash data records. The scan data and crash data may be compared to evaluate whether the vehicle systems requiring repair would have been expected or attributable to a particular collision event based on the collision data from the vehicle data recorder. The vehicle diagnostic system may thus be used to limit repairs to a vehicle that are attributable to the specific collision event. For example, an insurance company or repair facility may employ the diagnostic system of the present invention to avoid covering repairs that are not attributable to a covered collision event. These and other objects, advantages, purposes, and features of this invention will become apparent upon review of the following specification in conjunction with the drawings.

DESCRIPTION OF THE PREFERRED EMBODIMENTS

The present invention will now be described with reference to the accompanying figures, wherein the numbered elements in the following written description correspond to like-numbered elements in the figures.

Figure 1:
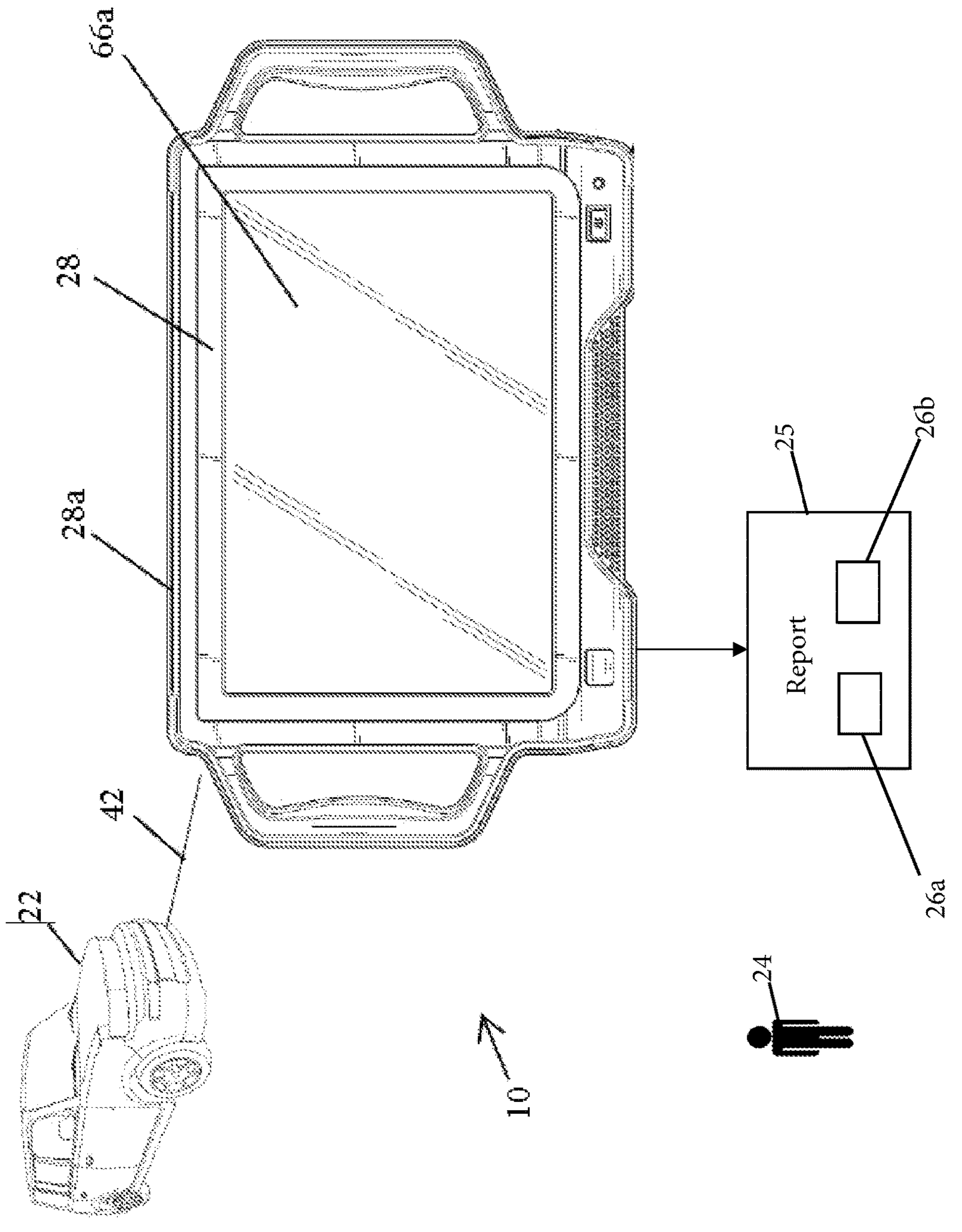
FIG. 1 is a diagram of a vehicle diagnostic system in accordance with the present invention showing a vehicle diagnostic tool connected to the electronic system of a vehicle.
Figure 2:
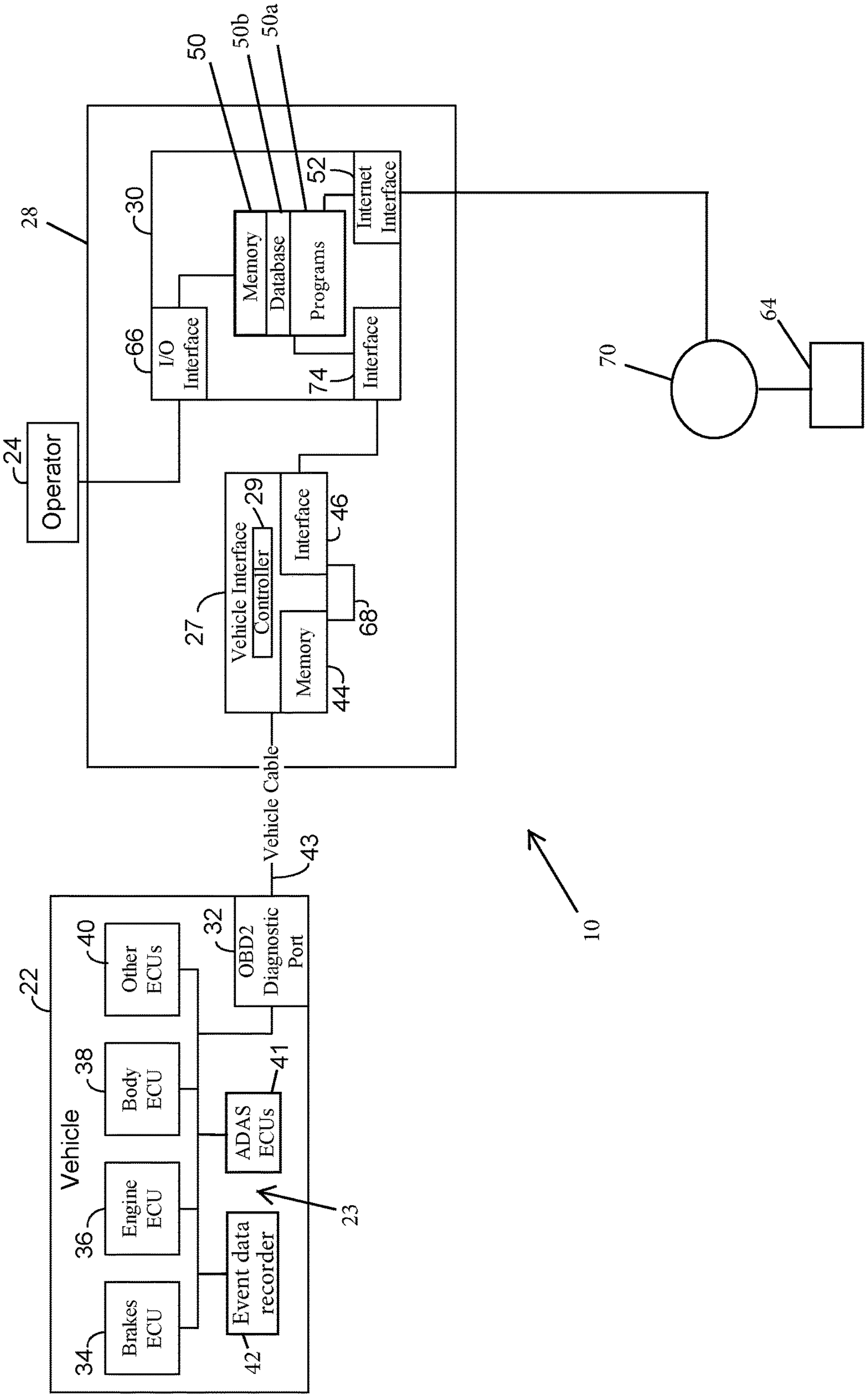
FIG. 2 is a block diagram of the vehicle diagnostic system in accordance with the present invention showing the diagnostic tool in relation to the electronic system of the vehicle.

A vehicle diagnostic system 10 for use with a vehicle 22 is shown for use by a user such as a mechanic or operator 24, such as in an automotive repair facility. System 10 is illustrated in FIGS. 1 and 2 as including a vehicle diagnostic tool 28, which as discussed in more detail below, is connected with vehicle 22 by operator 24, such as by connecting to an on-board diagnostic ("OBD") diagnostic port 32 of the vehicle 22 in order to diagnose the electronic system 23 of vehicle 22, including various vehicle electronic control units (ECUs), such as an engine ECU 34, body ECU 36, brakes ECU 38, and/or other ECUs 40, including safety systems such as Adaptive Driver Assistance Systems ("ADAS") ECUs 41, and including other electronic parts and components of vehicle 22, such as air bag computers. Vehicle diagnostic tool 28 is shown connected with port 32 via vehicle cable 43 and is used to scan the electronic system 23 of vehicle 22 to obtain diagnostic scan data, such as to determine any fault codes in the electronic system 23, which may be reported as diagnostic trouble codes ("DTCs") to thereby provide an indication to the mechanic 24 as to what repairs are needed on vehicle 22, such as after vehicle 22 has been in a collision or similarly damaged. Vehicle diagnostic tool 28 is further configured to read collision data from an event data recorder (EDR) 42 of the vehicle 22 contemporaneously with performing the noted diagnostic scan. As discussed in more detail below, vehicle diagnostic tool 28 outputs a report 25 that includes the scan data 26*a* and collision data 26*b*, where the provided data may be evaluated to determine whether and what scan data 26*a* fault codes may be attributable to a specific collision event based on the collision data 26*b*. In particular, the data from the crash data recorder 42 may be used to evaluate the results of the vehicle scan to determine if the vehicle systems requiring repair would have been expected or attributable to a particular collision event based on the collision data from the vehicle data recorder. Vehicle diagnostic tool 28 may further include a scan data evaluation program 53*d* for analyzing and outputting an indication of whether particular scan data 26*a* is attributable to a particular collision event as captured by the collision data 26*b*.

As discussed in more detail below, the vehicle diagnostic tool 28 is configured with or equipped to access both conventional diagnostic scan programs, e.g., original equipment ("OE") and aftermarket diagnostic scan programs, as well as includes a collision data reader program for scanning or reading collision data from one or more event data recorders (EDRs) 42 on vehicle 22. The diagnostic scan programs and the collision data reader program are used by the vehicle diagnostic tool 28 to obtain scan data DTCs and collision data in a vehicle 22 by connecting to one or more data ports on the vehicle, such as the OBD diagnostic port 32 in the illustrated embodiment.

As discussed herein, the event data recorder can be a single unit or a plurality of separate components. The event data recorder may incorporate or be incorporated into or referred to as an air bag computer or air bag control module. The event data recorder may also be known by a variety of different names, e.g., extended data recorder, crash data recorder, flight recorder, and black box. Hereinafter, such an event recorder is referred to as an event data recorder ("EDR"). An exemplary event data recorder includes a buffer memory and is configured to record data in a loop. For example, the buffer memory may be configured to hold approximately 5-10 seconds of data before a collision incident and then also record data of the collision incident itself. This data is held in the buffer until reset or removed by a technician.

As discussed herein, the collision data can include any one or more of the following: Whether the brakes were pressed and when; accelerator position; airbag deployment speed; when were the brakes pressed with respect to the time when the air bags were deployed (such a calculation could also be determined by the scan data evaluation program 53*d*; position and movement of the steering wheel, such as to determine whether the steering wheel was being turned prior to or at the time of the collision; velocity of the vehicle before and during the collision; status of whether the seatbelts were being worn by the vehicle occupants; pretensioner or force limiter engagement; driver distraction data; and (viii) possible "near crash events" may also be recorded in the loop memory, such as recording the crash data for events where an accident almost happened.

With reference to FIGS. 1 and 2, the vehicle diagnostic tool 28 in the illustrated embodiment includes a housing 28*a* containing circuitry, hardware, and software, such as a vehicle interface module 27 coupled with a computer module 30.

In use, tool 28 is connected with vehicle 22 by operator 24, such as by connecting to an on-board diagnostic ("OBD") diagnostic port 32 of the vehicle 22 in order to diagnose the electronic system 23 of vehicle 22, including various vehicle electronic control units (ECUs), such as an engine ECU 34, body ECU 36, brakes ECU 38, and/or other ECUs 40, including ADAS ECUs 41, the event data recorder 42, and including other electronic parts and components of vehicle 22. Tool 28 connects with port 32, such as via vehicle cable 43. Vehicle interface 27 includes a controller 29, such as in the form of a processor or micro-processor and interface circuitry to facilitate communication between the ECUs and the vehicle interface 27. The vehicle interface 27 includes a database of vehicle protocols found in a local memory 44 that allows communication with the ECUs of various makes and models of vehicles. Interface module 27 may be configured as an SAE standard J2534 device, such as a device compliant with the J2534-2 standard, or as an ISO compliant or other standard compliant device for supporting and enabling communication with the electronic systems of a vehicle. Vehicle diagnostic tool 28 additionally includes interfaces 46, 74 for communication between interface module 27 and computer module 30, where computer module 30 additionally includes a controller and memory. As understood from FIG. 2, vehicle diagnostic tool 28 may be connected to a remote computer, such as a server 64, such as by an Internet 70 connection with interface 52.

Figure 3:
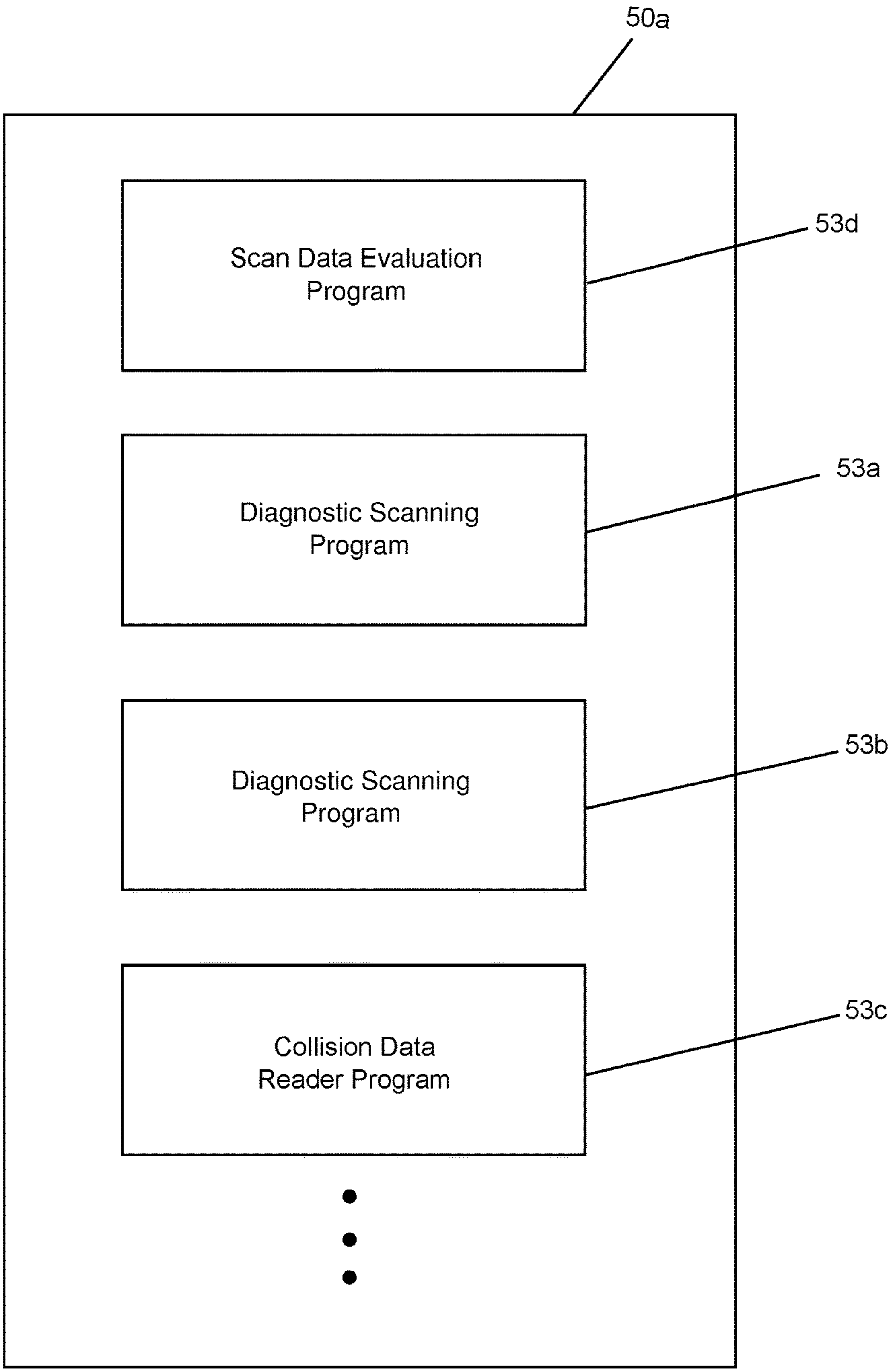
FIG. 3 is a block diagram of a plurality of computer programs contained within memory of the diagnostic tool of FIGS. 1 and 2 in accordance with the present invention.

Vehicle diagnostic system 10 may be configured to be selectively operable in one of a plurality of different modes, whereby a technician may use the diagnostic tool 28 for vehicle maintenance, diagnosis, programming, and repair as needed. In accordance with an embodiment of the present invention and with reference to FIG. 3, the computer module 30 includes a memory 50 for storing a database 50*b* and programs 50*a*, including one or more diagnostic scanning application programs 53*a*, 53*b* and one or more collision data scanning or reader programs 53*c*, as well as a scan data evaluation program 53*d*. The diagnostic scanning application programs include OEM diagnostic scanning programs 53*a* and third-party diagnostic scanning programs 53*b*, and it should be appreciated that multiple such programs may be included for use with multiple different makes and models of vehicles.

In the illustrated embodiment, vehicle diagnostic tool 28 includes one or more commercially available diagnostic scanning programs 53*a* and 53*b* and a collision data reader program 53*c* that are configured for use with the specific vehicle 22. Although shown as having two diagnostic scanning programs 53*a*, 53*b*, and the collision data reader program 53*c*, it should be appreciated that memory 50 can include additional such programs available for use with various vehicles 22 of different makes and models. Thus, numerous such diagnostic scanning programs 53*a*, 53*b* and collision data reader programs 53*c* can be stored in memory 50.

An exemplary diagnostic scanning program interfaces with the ECUs of a vehicle to allow fault codes (DTCs) to be ascertained. Data from the diagnostic scanning programs 53*a*, 53*b* and the collision data from the collision data scanning program 53*c* can be stored in database 50*b*. An exemplary diagnostic application scanning program comprises a program provided by an automotive manufacturer or a company that supplies diagnostic application programs, such as Opus IVS, Inc., with the diagnostic application scanning tool configured to enable the reading and reporting of fault codes in the electronic system of the vehicle such as may be located in ECUs of the vehicle. In practice, memory 50 may include multiple diagnostic application programs, each for use with various makes and/or models of vehicles to enable diagnosing and programming of ECUs via vehicle interface module 27, including depending on the particular vehicle systems/ECUs on the vehicle installed by the OEM based on the customer's selection of vehicle options. Alternatively, and/or additionally, memory 50 may include diagnostic application programs that may be used with multiple variations of vehicles. Vehicle interface module 27 and computer module 30 are thus cooperatively used for querying/scanning and diagnosing ECUs of vehicle 22, including for accessing error codes generated by the ECUs for assessing and diagnosing operational and performance related aspects of the vehicle 22. As discussed herein, the diagnostic tool 28 is also cooperatively used for querying/scanning the event data recorder 42 of the vehicle 22.

While a diagnostic scanning program 53*a*, 53*b* is used to scan the electronic system 23 to retrieve diagnostic trouble codes from ECUs, the collision data reader program 53*c* is used to retrieve collision data 26*b* from the vehicle's event data recorder 42. That is, contemporaneously with a diagnostic scanning program 53*a*. 53*b* being used to diagnose fault codes, the collision data scanning program 53*c* is used to diagnose collision damage and related analytical information. The collision data reader program 53*c* may obtain the collision data 26*b* prior to, during, or after running of a diagnostic scanning program 53*a*, 53*b* while the diagnostic tool 28 remains connected to vehicle 22.

As previously noted, vehicle diagnostic tool 28 generates a report 25 based on the obtained scan data 26*a* and collision data 26*b*, where report 25 in the illustrated embodiment may be formulated by scan data evaluation program 53*d*. Collision data 26*b* may be used to evaluate a specific collision event for purposes of determining if the obtained scan data 26*a* would be associated with the type of damage to the vehicle 22. For example, if the collision data 26*b* indicates a front end collision, such as by way of data related to the application of brakes, activation of seat belt tensioners, and/or deployment of frontal air bags, such a collision event may not be expected to have resulted to damage to the rear of the vehicle. Likewise, if the collision data 26*b* indicates a collision event in which the vehicle 22 rotates about a vertical axis (yaw) in a given direction whereby one side of the vehicle is rotated into a leading position, such a collision event may not be expected to have resulted to damage to the opposite side of the vehicle. Accordingly, collision data 26*b* may be used to evaluate whether or which of the obtained fault code scan data 26*a* may be attributable to the collision event. Still further, the collision data 26*b* may indicate that no collision event has occurred, whereby any damage to vehicle 22 should not be attributable to a collision.

In one embodiment report 25 includes scan data 26*a* and collision data 26*b*, where report 25 may be in an electronic format or file so as to be visible on screen 66*a* of vehicle diagnostic tool 28. Alternatively, report 25 may be transmitted to a remote computer 64 and/or comprise a printed report. In a further particular embodiment scan data evaluation program 53*d* may analyze scan data 26*a* and collision data 26*b* to identify potential fault codes requiring repair that may be attributable to a collision event based on the obtained collision data 26*b* and identify potential fault codes that should not be attributable to a collision event based on the obtained collision data 26*b*. For example, database 50*b* may include tables or matrixes correlating collision data 26*b* to probable associated fault code scan data 26*a*. Scan data evaluation program 53*d*, in which case, may access database 50*b* to generate a report 25 to assess what fault code scan data 26*a* may be attributable to the given collision event based on the obtained collision data 26*b*. Alternatively, scan data evaluation program 53*d* may employ algorithms for evaluating and correlating the scan data 26*a* with the collision data 26*b* to assess what fault code scan data 26*a* may be attributable to the given collision event based on the obtained collision data 26*b*. Still further, machine learning may be employed, such as based on algorithms and statistical models of multiple collision events, to analyze and assess what fault code scan data 26*a* may be attributable to the given collision event based on the obtained collision data 26*b*.

Still further, vehicle diagnostic tool 28 may include programing for evaluating fault codes to categorize the fault codes obtained in the scan data 26*a* as being collision related fault codes or mechanical related fault codes, such as disclosed in co-owned U.S. patent application Ser. No. 17/743,060, which is incorporated herein by reference in its entirety. This additionally may be utilized to separate fault codes that can be considered to be maintenance issues related to wear and tear, i.e., repair issues that are not related to a collision event, from fault codes that can be considered to occur due to a collision. The fault code evaluating programming may be part of the scan data evaluation program 53*d*, or may comprise a separate fault code evaluation program, such as disclosed in U.S. patent application Ser. No. 17/743,060. It should be understood that fault codes associated with mechanical related failures may be disregarded and thereby not attributed to a collision event.

In accordance with the present invention, a system and method is provided for evaluating DTCs retrieved from ECUs in a vehicle 22 that suffered a collision or similar damage are thus evaluated and may be presented to an insurer to provide the insurer with information to assess the probability that DTCs reported from the vehicle 22 are preexisting, such as maintenance related or caused by some other event, versus DTCs that were caused by, or related to, a specific collision event. For example, the diagnostic vehicle tool 28 is configured to evaluate the DTCs to flag issue areas that might not be covered by the vehicle's insurance, such as systems associated with DTCs related to preexisting damage or mechanical wear and tear and likely preexisting issues before the collision event. This includes determining that no collision event occurred, or did not occur within a recent period of time, such that any fault codes determined are not attributable to an alleged collision event. The system and method may thereby be used to prevent fraudulent insurance claims.

Thus, such a report relating to the scan data 26*a* and collision data 26*b* may be used by an insurance adjuster or the insurance company itself to evaluate the vehicle's accident. In other words, such a review allows for a comparison of what the collision data 26*b* are indicating happened to the vehicle 22, versus what the physical damage to the vehicle 22 shows (e.g., severe damage to rear of the vehicle, but the crash data reveals that only a front impact was experienced during the "crash event") (see FIG. 6).

Figure 4:
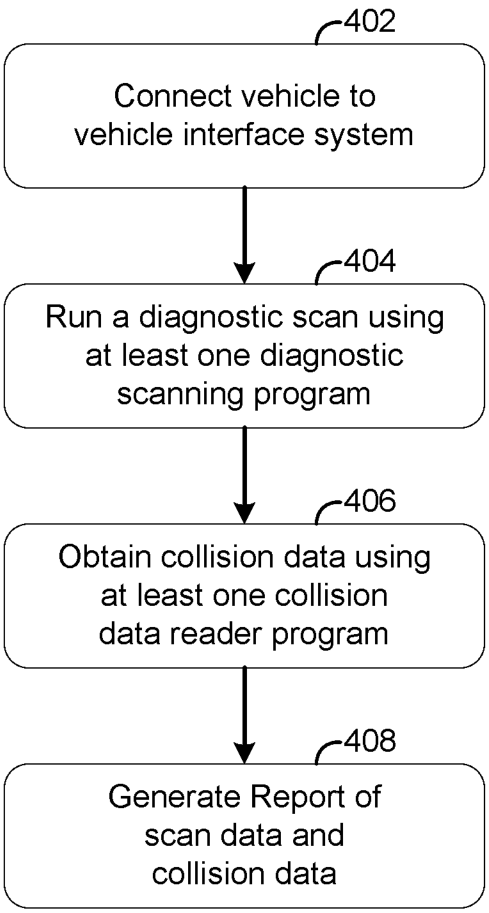
FIGS. 4-6 are flow diagrams illustrating steps to methods for utilizing the diagnostic system of FIGS. 1-3 to obtain scan data and collision data and generate a report in accordance with aspects of the present invention.

FIG. 4 is a flow diagram illustrating the steps to a method for evaluating a vehicle after a collision event or alleged collision event. The method uses detected DTCs to aid in identifying potential vehicle components in need of repair based on a collision event and conflicts between the detected DTCs of the scan data 26*a*, any actual physical damage on the vehicle, and the collision data 26*b*. In step 402 of FIG. 4, a vehicle 22 to be evaluated is communicatively coupled to a vehicle diagnostic tool 28 via a vehicle cable 43. In step 404 of FIG. 4, a diagnostic scan is run using at least one diagnostic scanning program to obtain scan data 26*a*. For example, an OEM supplied diagnostic scanning program and/or an aftermarket diagnostic scanning program could be run to scan the vehicle 22. The scan(s) send queries to the vehicle 22, which is responded to by a plurality of ECUs on the vehicle 22. In step 406 of FIG. 4, collision data 26*b* is obtained from an EDR 42 using at least one collision data reader program 53*c*. In step 408 of FIG. 4, a report 25 is generated, such as using a scan data evaluation program 53*d*, identifying the obtained scan data 26*a* and collision data 26*b* to enable an analysis or assessment of what fault code scan data 26*a* may be attributable to the given collision event based on the obtained collision data 26*b*.

Figure 5:
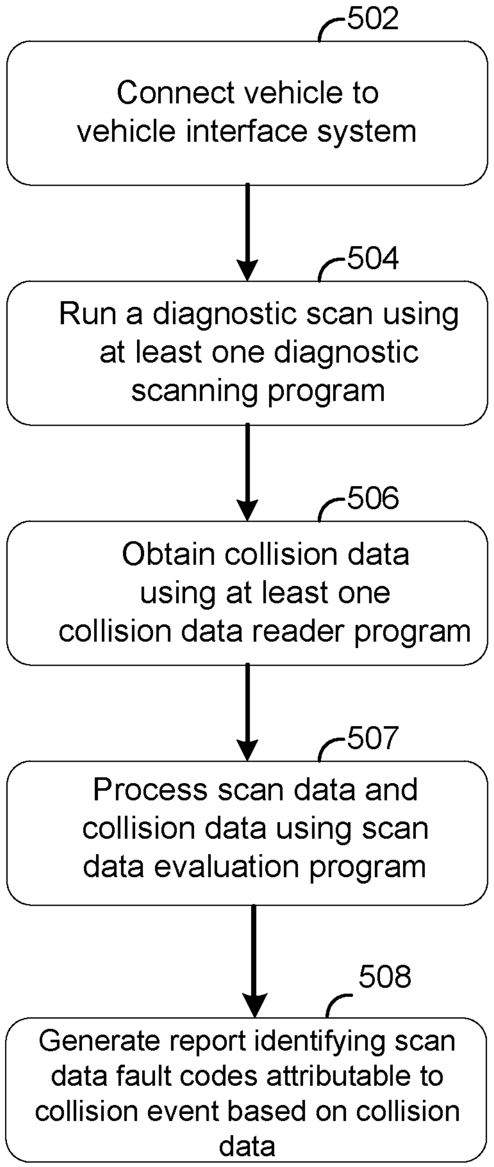

FIG. 5 is a flow diagram illustrating the steps to a method for evaluating a vehicle after a collision event or alleged collision event. The method uses crash data retrieved from an event data recorder to identify vehicle components likely in need of repair based on the collision in view of the collision data, the scan data, and the physical damage to the vehicle. In step 502 of FIG. 5, a vehicle 22 to be evaluated is communicatively coupled to a vehicle diagnostic tool 28 via a vehicle cable 43. In step 504 of FIG. 5, a diagnostic scan is run using at least one diagnostic scanning program to obtain scan data 26*a*. The crash data scanning program is configured to scan for, and retrieve, crash data found in an event data recorder of the vehicle 22. In step 506 of FIG. 5, collision data 26*b* is obtained from an EDR 42 using at least one collision data reader program 53*c* In step 507 of FIG. 5, the obtained scan data 26*a* and collision data 26*b* are processed via a scan data evaluation program 53*d* to analyze or assess what fault code scan data 26*a* may be attributable to the given collision event based on the obtained collision data 26*b*. In step 508 of FIG. 5, a report 25 is generated, such as using a scan data evaluation program 53*d*, to provide the analysis or assessment by program 53*d* of what fault code scan data 26*a* is attributable to the given collision event based on the obtained collision data 26*b*.

Figure 6:
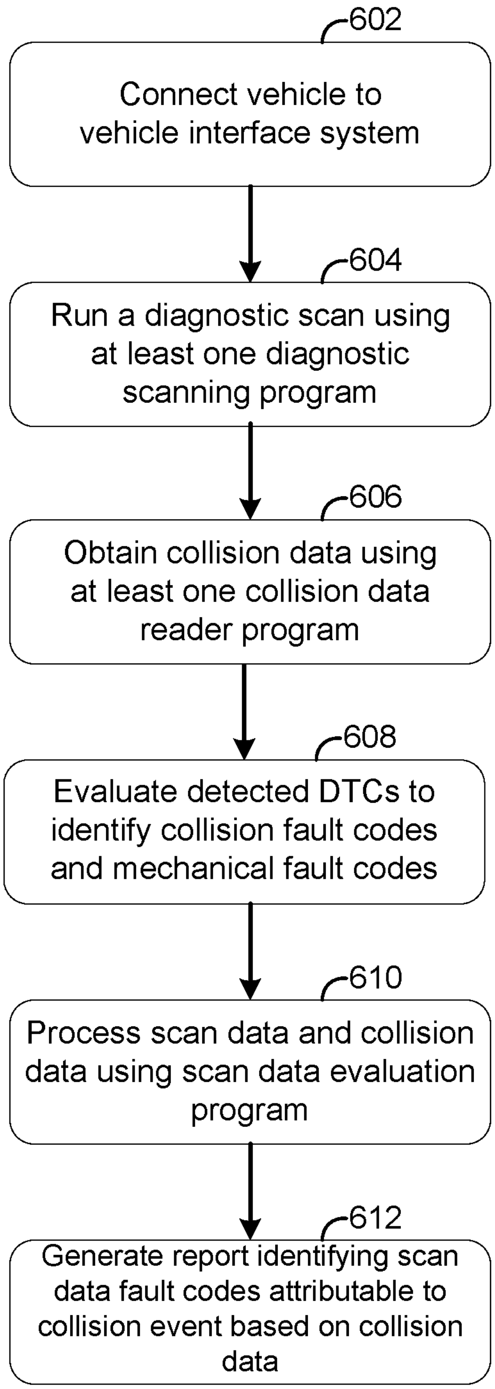

FIG. 6 is a flow diagram illustrating the steps to a method for evaluating a vehicle after a collision event or alleged collision event. The method uses identified DTCs and retrieved collision data to identify vehicle components likely in need of repair based on the collision in view of potential conflicts between the DTCs and the collision data. In step 602 of FIG. 6, a vehicle 22 to be evaluated is communicatively coupled to a vehicle diagnostic tool 28 via a vehicle cable 43. In step 604 of FIG. 6, a diagnostic scan is run using at least one diagnostic scanning program. For example, an OEM supplied diagnostic scanning program and/or an aftermarket diagnostic scanning program could be run to scan the vehicle 22. In step 606 of FIG. 6, collision data 26*b* is obtained from an EDR 42 using at least one collision data reader program 53*c*. In step 608 of FIG. 6, detected DTCs are evaluated, such as by way of a fault code evaluation program as disclosed in U.S. patent application Ser. No. 17/743,060, to identify collision fault codes and mechanical fault codes, where collision codes are those DTCs that are causally connected to a collision. In step 610 of FIG. 6, the collision related fault codes from the obtained scan data 26*a* as evaluated in step 608 and the collision data 26*b* are processed via a scan data evaluation program 53*d* to analyze or assess what fault code scan data 26*a* may be attributable to the given collision event based on the obtained collision data 26*b*. In step 612 of FIG. 6, a report 25 is generated, such as using a scan data evaluation program 53*d*, to provide the analysis or assessment by program 53*d* of what fault code scan data 26*a* is attributable to the given collision event based on the obtained collision data 26*b*. Still further, in any of the above methods the retrieved collision data 26*b* may be reviewed with respect to the physical damage on the vehicle 22 to identify any conflicts between the collision data 26*b* and the vehicle's physical damage. For example, if the crash data indicates a front impact but no matching rear impact, a conflict may be indicated if there is also rear damage seen on the vehicle.

It should be appreciated that numerous alternative configurations of system 10 and/or diagnostic vehicle tool 28 may be employed. For example, although vehicle diagnostic tool 28 is discussed above as conforming with the SAE J2534 standard, it should be appreciated that alternatively configured vehicle diagnostic and programming tools may be employed within the scope of the present invention, including alternatively configured tools for alternative types of vehicles, such as alternative classes of vehicles. Accordingly, an interface tool may conform with the ISO 22900 standard, or RP1210 standard, or may operate under the ELM327 command protocol.

As noted, the software and/or hardware of diagnostic and programming tools may be required to be updated to operate with new vehicles and/or enable programming and diagnosing of existing vehicles. In the above noted embodiments, the vehicle interface diagnostic tool 28 may be periodically updated via an Internet connection, or may be returned to the supplier for updating, including with regard to hardware updates. This may be done by the supplier of the vehicle interface diagnostic tool 28 whereby the local operator 24 need not spend time attempting to maintain the equipment.

In the illustrated embodiment vehicle diagnostic tool 28 is disclosed as including diagnostic scanning programs 53*a*, 53*b*, collision data reader programs 53*c*, and scan data evaluation program 53*d*. It should be appreciated that alternative arrangements may be employed within the scope of the present invention. For example, one or more of the various programs may reside on different devices, such as for example on remote computer 64. Still further, although diagnostic evaluation program 51 and diagnostic scanning programs 53*a*, 53*b*, 53*c* are illustrated and discussed herein as being separate programs, one or more of such programs may be combined together and operate as subroutines. Diagnostic tool 28 in the illustrated embodiment is disclosed as an integrated device with vehicle interface 27 and computer module 30 being contained within housing 28. Alternatively, however, vehicle interface 27 and computer 30 may be separate devices, with computer 30 configured as a laptop, tablet or other computing device.

Diagnostic tool 28 may, either in addition to the above noted various loaded diagnostic scanning applications or in place thereof, be used to access remotely located diagnostic applications, such as that may reside on remotely located servers 64. This may be done, for example, to avoid the need for obtaining and locally storing and maintaining diagnostic applications on diagnostic tool 28. In the illustrated embodiment, diagnostic tool 28 includes an input/output (I/O) interface 66 for coupling to peripheral devices, such as one or more of a monitor, keyboard, mouse, and the like. In a further illustrated embodiment, the diagnostic tool 28 is implemented as a laptop computer with integrated monitor, keyboard, and mouse.

System 10, in addition to performing scanning operations, may also be used for reprogramming of vehicle 22, such as reprogramming selected ECUs, including reprogramming ECUs based on a determination of fault codes.

Thus, embodiments of the present invention can receive a full scan of DTCs from the electrical system of the vehicle, as well as receiving a full report from the vehicle's event data recorder. With the DTCs report and the crash data report, a report can be generated that combines the data. Such combinations can include segregating the DTCs according to whether they are considered maintenance codes or crash codes. Furthermore, the DTCs and crash data may be assessed and compared to the physical damage on the vehicle to see if the physical damage on the vehicle matches the crash data (and crash DTCs).

Changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. A method of assessing damage to a vehicle, the method comprising:

providing a vehicle diagnostic system comprising a vehicle diagnostic computer tool configured to operate in a mode to scan a vehicle to obtain scan data and configured to obtain collision data from an event data recorder installed and retained on the vehicle, wherein the event data recorder is configured to record collision data during a collision event of the vehicle;

connecting the vehicle diagnostic computer tool with a diagnostic port of the vehicle to be in communication with an electronic system of the vehicle;

obtaining scan data from the electronic system of the vehicle with the vehicle diagnostic computer tool using a diagnostic scanning program, wherein the scan data is used to determine vehicle systems requiring repair;

obtaining collision data from the event data recorder with the vehicle diagnostic computer tool using a collision data reader program, wherein the scan data and the collision data are obtained contemporaneously; and indicating with the vehicle diagnostic computer tool whether the vehicle systems requiring repair are attributable to a collision event by analyzing with an evaluation program both the scan data and the collision data to determine if the vehicle systems requiring repair based on the scan data (i) are attributable to the collision event based on the collision data or (ii) are not attributable to the collision event based on the collision data.

2. The method of claim 1, further comprising reporting the scan data together with the collision data and generating a report comprising the evaluation of the scan data based on the collision data, wherein the report identifies those vehicle systems requiring repair that are attributable to the collision event.

3. The method of claim 2, wherein the vehicle diagnostic computer tool generates the report.

4. The method of claim 2, wherein the report, the scan data, and the collision data are transmitted to a remote computer via the vehicle diagnostic computer tool.

5. The method of claim 1, wherein at least one of the diagnostic scanning program and the collision data reader program are retained in a memory of the vehicle diagnostic computer tool.

6. The method of claim 1, wherein at least one of the diagnostic scanning program and the collision data reader program are retained at a remote computer and accessible via the vehicle diagnostic computer tool.

7. The method of claim 1, wherein at least one of the diagnostic scanning program, the collision data reader program and the evaluation program are retained in a memory of the vehicle diagnostic computer tool.

8. The method of claim 1, wherein at least one of the diagnostic scanning program, the collision data reader program and the evaluation program are retained at a remote computer and accessible via the vehicle diagnostic computer tool.

9. A vehicle diagnostic system configured for scanning an electronic system of a vehicle to obtain scan data and configured to obtain collision data from an event data recorder installed and retained on the vehicle, said vehicle diagnostic system comprising:

a vehicle diagnostic computer tool comprising a vehicle interface and a computer module, wherein said vehicle diagnostic computer tool is configured to connect to a data port of a vehicle to be in communication with an electronic system of the vehicle;

a diagnostic scanning program configured for use with the vehicle diagnostic computer tool to obtain scan data from the electronic system of the vehicle, wherein the vehicle diagnostic computer tool is configured to use the scan data to determine vehicle systems requiring repair;

a collision data reader program configured for use with the vehicle diagnostic computer tool to obtain collision data from the event data recorder, wherein the event data recorder is configured to record collision data during a collision event on the vehicle, wherein the scan data and the collision data are obtained contemporaneously;

wherein the vehicle diagnostic system comprises an evaluation program operable to indicate whether the vehicle systems requiring repair are attributable to a collision event by analyzing both the scan data and the collision data to determine if the vehicle systems requiring repair based on the scan data (i) are attributable to the collision event based on the collision data or (ii) are not attributable to the collision event based on the collision data.

10. The vehicle diagnostic system of claim 9, wherein the vehicle diagnostic computer tool is configured to generate a report of the scan data together with the collision data, wherein the report comprises the evaluation of the scan data based on the collision data and identifies those vehicle systems requiring repair that are attributable to the collision event based on the collision data.

11. The vehicle diagnostic system of claim 9, wherein the vehicle diagnostic computer tool includes an internet interface for connecting to a remote computer, and wherein the vehicle diagnostic computer tool is configured to transmit the report, the scan data, and the collision data to a remote computer.

12. The vehicle diagnostic system of claim 9, wherein at least one of the diagnostic scanning program and the collision data reader program are retained in a memory of the vehicle diagnostic computer tool.

13. The vehicle diagnostic system of claim 9, wherein at least one of the diagnostic scanning program and the collision data reader program are retained at a remote computer and accessible via the vehicle diagnostic computer tool.

14. The vehicle diagnostic system of claim 9, wherein the vehicle diagnostic computer tool comprises a vehicle interface and a computer module, and wherein the vehicle interface includes a vehicle protocol for enabling communications with the electronic system of the vehicle.

15. The vehicle diagnostic system of claim 9, wherein the evaluation program is retained in a memory of the vehicle diagnostic computer tool.

* * * * *